(12) United States Patent
Hsu et al.

(10) Patent No.: US 10,804,660 B2
(45) Date of Patent: Oct. 13, 2020

(54) OUTLET DEVICE

(71) Applicant: POWERTECH INDUSTRIAL CO., LTD., New Taipei (TW)

(72) Inventors: Jung-Hui Hsu, New Taipei (TW); Su-Ying Peng, Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 119 days.

(21) Appl. No.: 16/154,792

(22) Filed: Oct. 9, 2018

(65) Prior Publication Data

US 2019/0044292 A1 Feb. 7, 2019

Related U.S. Application Data

(63) Continuation-in-part of application No. 15/612,614, filed on Jun. 2, 2017, now abandoned.

(30) Foreign Application Priority Data

Oct. 26, 2016 (TW) .............................. 105134550 A

(51) Int. Cl.
*H01H 9/02* (2006.01)
*H01R 25/00* (2006.01)
(Continued)

(52) U.S. Cl.
CPC ........... *H01R 25/006* (2013.01); *A47F 10/00* (2013.01); *H01R 13/73* (2013.01); *H01R 24/60* (2013.01); *H01R 24/66* (2013.01); *H01R 24/76* (2013.01); *H01R 25/003* (2013.01); *H01R 27/02* (2013.01); *H02G 3/18* (2013.01);
(Continued)

(58) Field of Classification Search
CPC ............ H02G 3/18; H02G 3/08; H02G 3/081; H02G 3/083; H02G 3/086; H01R 24/66; H01R 25/00; H01R 24/76; H01R 13/73; H01R 24/60; H01R 25/003; H01R 27/02; H01R 13/70; H01R 13/46; H01R 11/00; H01R 25/006; A47F 10/00; A47B 2200/0085; A47B 2200/09; H01H 9/02;
(Continued)

(56) References Cited

U.S. PATENT DOCUMENTS 6,004,157 A * 12/1999 Glass ...................... H01R 13/73
439/535
6,379,182 B1 * 4/2002 Byrne ...................... H01R 13/73
439/574

(Continued)

*Primary Examiner* — Angel R Estrada
(74) *Attorney, Agent, or Firm* — Li & Cai Intellectual Property (USA) Office

(57) ABSTRACT

An outlet device for hanging on a plate includes a counterweight portion, a hanging portion arranged distant from the counterweight portion, an extending portion having two ends respectively connected to the counterweight portion and the hanging portion, and a power core connected to the counterweight portion. Each of the counterweight portion and the hanging portion has an outlet unit electrically connected to the power core. The outlet device is configured so that the counterweight portion is arranged under the plate and the hanging portion is arranged on the plate, and the hanging portion remains hung on the plate by using a weight distribution of the outlet device, thereby maintaining the outlet device in a static balance state.

16 Claims, 12 Drawing Sheets

(51) Int. Cl.
*H01R 13/73* (2006.01)
*H01R 24/66* (2011.01)
*H01R 24/76* (2011.01)
*H01R 24/60* (2011.01)
*H02G 3/18* (2006.01)
*H01R 27/02* (2006.01)
*A47F 10/00* (2006.01)
*H01R 13/70* (2006.01)

(52) U.S. Cl.
CPC ... *A47B 2200/0085* (2013.01); *A47B 2200/09* (2013.01); *H01R 13/70* (2013.01)

(58) Field of Classification Search
CPC ............ H01H 9/00; H01H 9/04; H01H 13/04; H01H 21/04
USPC ....... 174/480, 481, 50, 53, 57, 58, 559, 520; 220/3.2–3.9, 4.02; 439/107, 142, 148, 439/135
See application file for complete search history.

(56) References Cited

U.S. PATENT DOCUMENTS

| | | | |
|---|---|---|---|
| 6,445,087 B1 * | 9/2002 | Wang | H01R 25/003 307/140 |
| 6,540,554 B2 * | 4/2003 | McCarthy | H01R 13/73 439/574 |
| 6,666,712 B1 * | 12/2003 | Kramer | H01R 25/003 439/501 |
| 7,083,421 B1 * | 8/2006 | Mori | H01R 13/46 439/574 |
| 8,292,657 B2 * | 10/2012 | Singh | H01R 13/6633 439/505 |
| 8,469,748 B2 * | 6/2013 | Chambers | H01R 13/005 439/577 |
| 10,312,648 B2 * | 6/2019 | Hsu | H01R 24/66 |
| 10,367,317 B1 * | 7/2019 | Rahner | H01R 25/003 |
| 10,476,216 B2 * | 11/2019 | Byrne | H01R 25/006 |

* cited by examiner

OUTLET DEVICE

CROSS-REFERENCE TO RELATED PATENT APPLICATION

This U.S. Non-provisional application for patent is a continuation-in-part application of patent application Ser. No. 15/612,614 filed on Jun. 2, 2017, which claims the priority of Taiwan patent application serial no. 105134550, filed Oct. 26, 2016, and is now abandoned. The entirety of each of the above-mentioned patent applications is hereby incorporated by reference herein and made as a part of this specification.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an outlet, and more particularly to an outlet device for hanging on a plate of a furniture.

BACKGROUND OF THE DISCLOSURE

The structure of a conventional outlet device has not undergone any significant changes in recent years, thus limiting the functions thereof. For example, when the conventional outlet device is applied to a desk, the device is either disposed on the desk or under the desk. Therefore, the single conventional outlet device cannot satisfy a condition where an outlet is needed both over and under the desk.

SUMMARY OF THE DISCLOSURE

In response to the above-referenced technical inadequacies, the present disclosure provides an outlet device to solve the drawback associated with conventional outlet devices.

In one aspect, the present disclosure provides an outlet device for being hung on a periphery portion of a plate of furniture. The outlet device includes a counterweight portion, a hanging portion, an extending portion, and a power cord. The counterweight portion includes a first case and a first outlet unit arranged in the first case. The hanging portion includes a second case and a second outlet unit arranged in the second case. The extending portion includes a third case having two opposite ends respectively connected to the first case of the counterweight portion and the second case of the hanging portion. The power cord is electrically connected to at least one of the first outlet unit and the second outlet unit through a front side of the first case. The first case, the second case, and the third case are formed with a U-shaped hanging slot on an inner side thereof for being hung on the periphery portion of the plate; when the U-shaped hanging slot of the outlet device is hung on the periphery portion of the plate by adapting the counterweight portion to be arranged under the plate and the hanging portion to be arranged on the plate, the hanging portion remains hung on the plate by using a weight distribution of the outlet device, thereby maintaining the outlet device in a static balance state.

In one aspect, the present disclosure provides an outlet device for being hung on a periphery portion of a plate of a furniture. The outlet device includes a counterweight portion, a hanging portion, an extending portion, and a power cord. The counterweight portion includes a first case and a first outlet unit arranged in the first case. The hanging portion includes a second case and a second outlet unit arranged in the second case. The extending portion includes a third case having two opposite ends respectively connected to the first case of the counterweight portion and the second case of the hanging portion. The first case, the second case, and the third case define a U-shaped hanging slot for receiving the periphery portion of the plate. A free end of the second case is arranged distant from the third case of the extending portion by a lateral distance. The lateral distance is defined as a distance between the free end of the second case and the third case along a lateral direction which is a direction perpendicular to the third case, the third case has a width along the lateral direction, the width of the third case is less than or equal to the lateral distance between the free end of the second case and the third case. The power cord is electrically connected to the first outlet unit and the second outlet unit through a front side of the first case. When in use, the periphery portion of the plate is inserted into the U-shaped hanging slot defined by the first case, the second case, and the third case, the counterweight portion is arranged under the plate and the hanging portion is arranged onto the plate, the outlet device remains hung on the periphery portion of the plate due to a self weight of the outlet device, thereby maintaining the outlet device in a static balance state.

In one aspect, the present disclosure provides an outlet device for being hung on a periphery portion of a top of a table. The outlet device includes a U-shaped structure, a first outlet, and a second outlet. The U-shaped structure includes a first case, a second case, and a third case that is connected to the first case and the second case. The first case, the second case, and the third case jointly define a U-shaped hanging slot on an inner side thereof, and a distance between the first case and the second case is fixed. The first outlet and the second outlet are respectively arranged in the first case and the second case. When in use, the periphery portion of the top of the table is inserted into the U-shaped hanging slot, the first case and the first outlet are arranged under the top of the table and the second case is arranged onto the top of the table, the outlet device remains hung on the periphery portion of the top of the table due to a self weight of the outlet device, thereby maintaining the outlet device in a static balance state.

Therefore, the outlet device of the present disclosure can satisfy a condition where an outlet is simultaneously needed both over and under a plate by disposing the hanging portion on the plate to provide the first outlet unit under the plate and the second outlet unit above the plate.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
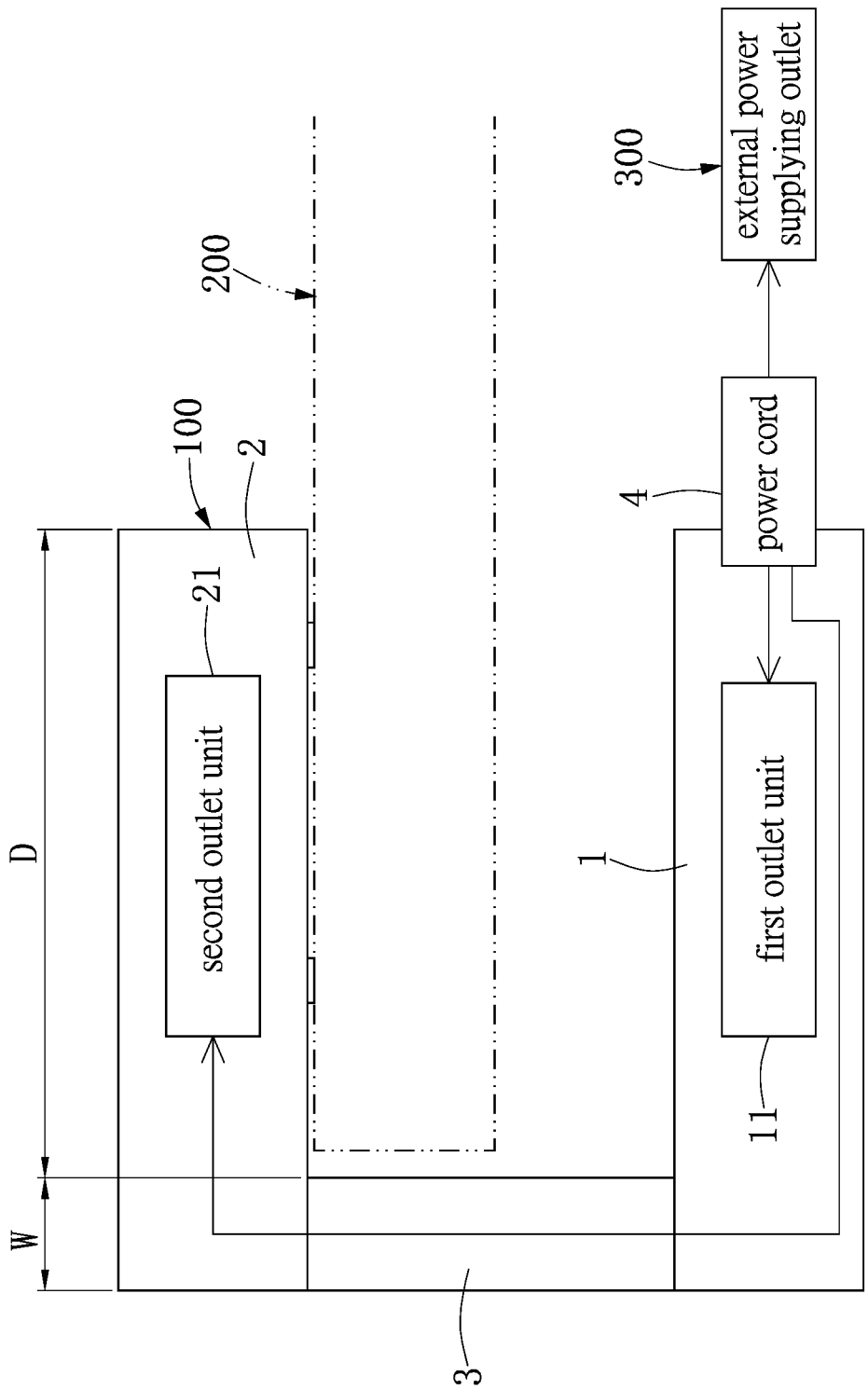
FIG. 1 is a schematic view showing an outlet device hanging on a periphery portion of a plate of a table and electrically connected to a power supplying outlet according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIGS. 1 to 12. FIG. 1 illustrates a schematic view of the present disclosure, and FIGS. 2 to 12 illustrate a first embodiment, a second embodiment, and a third embodiment of the present disclosure. References are hereunder made to the detailed descriptions and appended drawings in connection with the present disclosure. However, the appended drawings are merely provided for exemplary purposes, and should not be construed as restricting the scope of the present disclosure.

As shown in FIG. 1, the present disclosure provides an outlet device 100 for being hung on a periphery portion of a plate 200 of a table. Specifically, the plate 200 can be a portion of furniture that is substantially arranged in a horizontal plane for defining an upper space and a lower space. In certain embodiments, the plate 200 means the top of a table (e.g., the table can be a desk, an office table, or a counter), or the plate 200 can be a partition of bookshelf, a partition of office, a partition of counter, or a partition of wardrobe, but the present disclosure is not limited thereto. The outlet device 100 includes a counterweight portion 1, a hanging portion 2 arranged distant from the counterweight portion 1, an extending portion 3 connected to the counterweight portion 1 and the hanging portion 2, and a power cord 4 connected to the counterweight portion 1.

Figure 4:
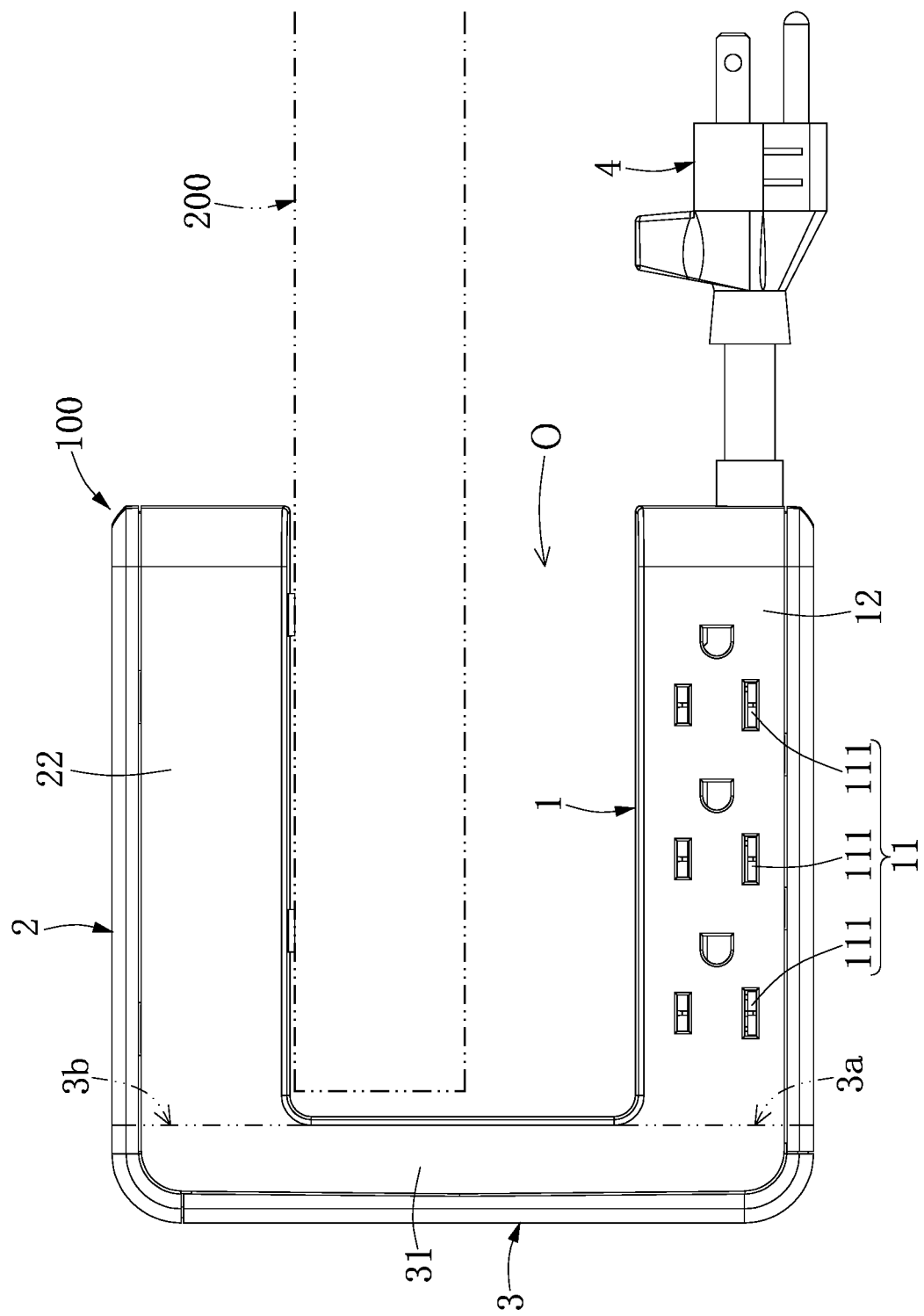
FIG. 4 is a planar view showing the outlet device of FIG. 2 hanging on a periphery portion of a plate.

Specifically, as shown in FIG. 4, the extending portion 3 has two opposite ends 3a, 3b (i.e., the bottom end 3a and the top end 3b of the extending portion 3 as shown in FIG. 1) respectively connected to the counterweight portion 1 and the hanging portion 2. The connection of the extending portion 3 and the counterweight portion 1 (or the hanging portion 2) can be, but is not limited to, an integral connection, a detachable connection, a slidable connection, or a rotatable connection.

Moreover, the counterweight portion 1 includes a first outlet unit 11, and the hanging portion 2 includes a second outlet unit 21. The outlet device 100 is configured to hang on the periphery portion of the plate 200 by adjusting the weight distribution of the counterweight portion 1, the hanging portion 2, and the extending portion 3. The outlet device 100 can be firmly hung on the periphery portion of the plate 200 by adjusting the size proportion of the hanging portion 2 and the extending portion 3. For example, a free end of the hanging portion 2 (i.e., the right end of the hanging portion 2 as shown in FIG. 1) is arranged distant from the extending portion 3 by a lateral distance D, the extending portion 3 has a width W parallel to the lateral distance D, and the width W is less than or equal to the lateral distance D. Moreover, a front side of a first case 12 can be also arranged distant from the extending portion 3 by the lateral distance D.

The power cord 4 having a plurality of cables passes thorough the counterweight portion 1 and is connected to the first outlet unit 11 and the second outlet unit 21, and the power cord 4 is used for detachably inserting into an external power supplying outlet 300. The power cord 4 is electrically connected to the first outlet unit 11 and the second outlet unit 21 through the front side of the first case 12, thereby transmitting power from the external power supplying outlet 300 to the first outlet unit 11 and the second outlet unit 21. The connection of the power cord 4 and the counterweight portion 1 can be, but is not limited to, a fixed connection, a detachable connection, or a rotatable connection.

Accordingly, the outlet device 100 is configured to arrange the counterweight portion 1 under the plate 200 and to arrange the hanging portion 2 on the plate 200, and the hanging portion 2 remains hung on the periphery portion of the plate 200 by using a weight distribution (or a self weight) of the outlet device 100, thereby maintaining the outlet device 100 in a static balance state. Thus, the outlet device 100 of the present disclosure can satisfy a condition where an outlet under the plate 200 and an outlet on the plate 200 are needed at the same time by disposing the hanging portion 2 on the periphery portion of the plate 200 to provide the first outlet unit 11 under the plate 200 and the second outlet unit 21 above the plate 200.

The common features of the outlet device 100 of the present disclosure have been disclosed in the above description, and a designer can use the above common features to form different embodiments of the outlet device 100. However, since the present disclosure cannot disclose all possible embodiments of the outlet device 100, the following description describes only some embodiments of the outlet device 100, but the present disclosure is not limited thereto.

First Embodiment

Figure 2:
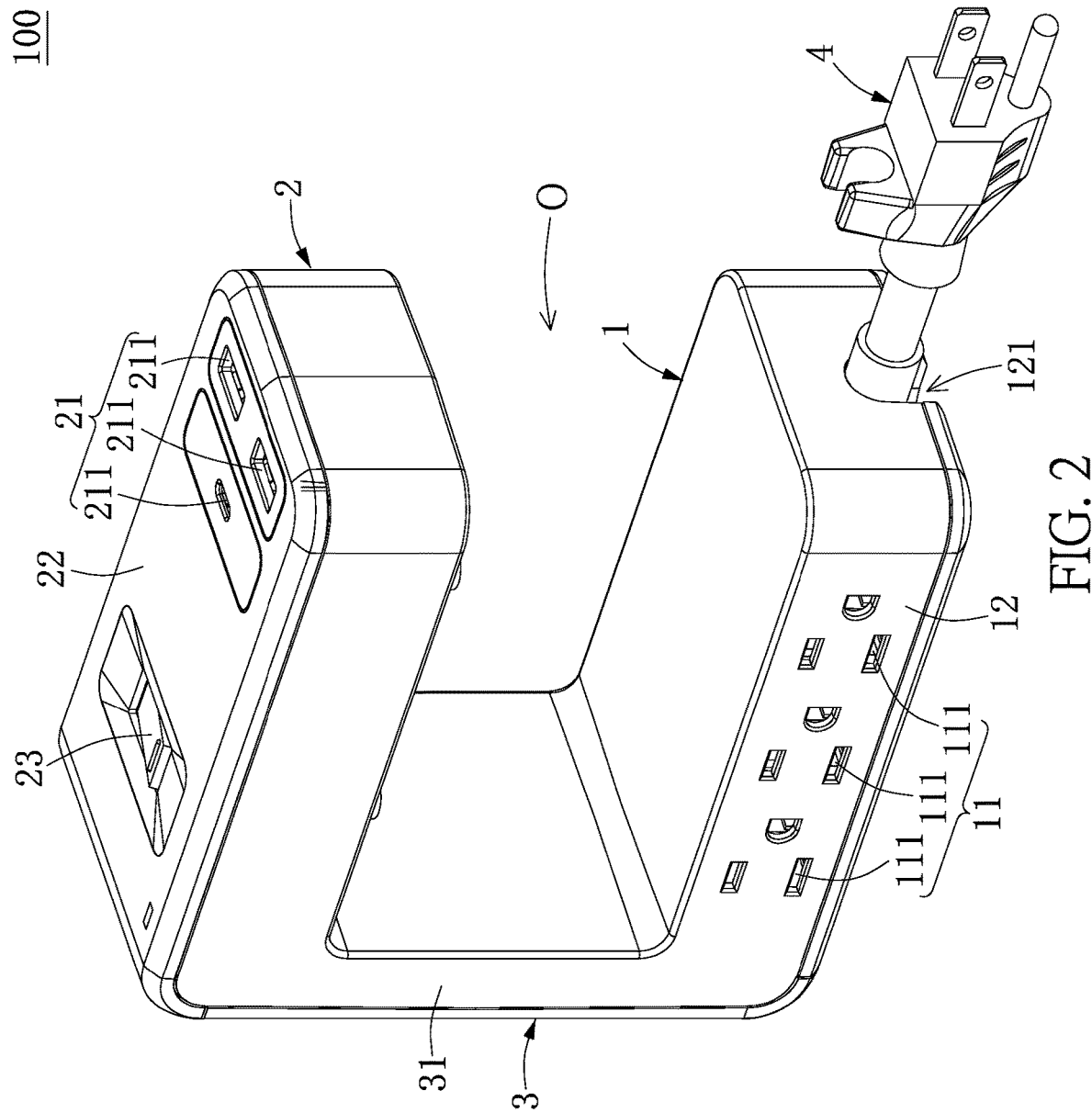
FIG. 2 is a perspective view showing the outlet device according to a first embodiment of the present disclosure.
Figure 3:
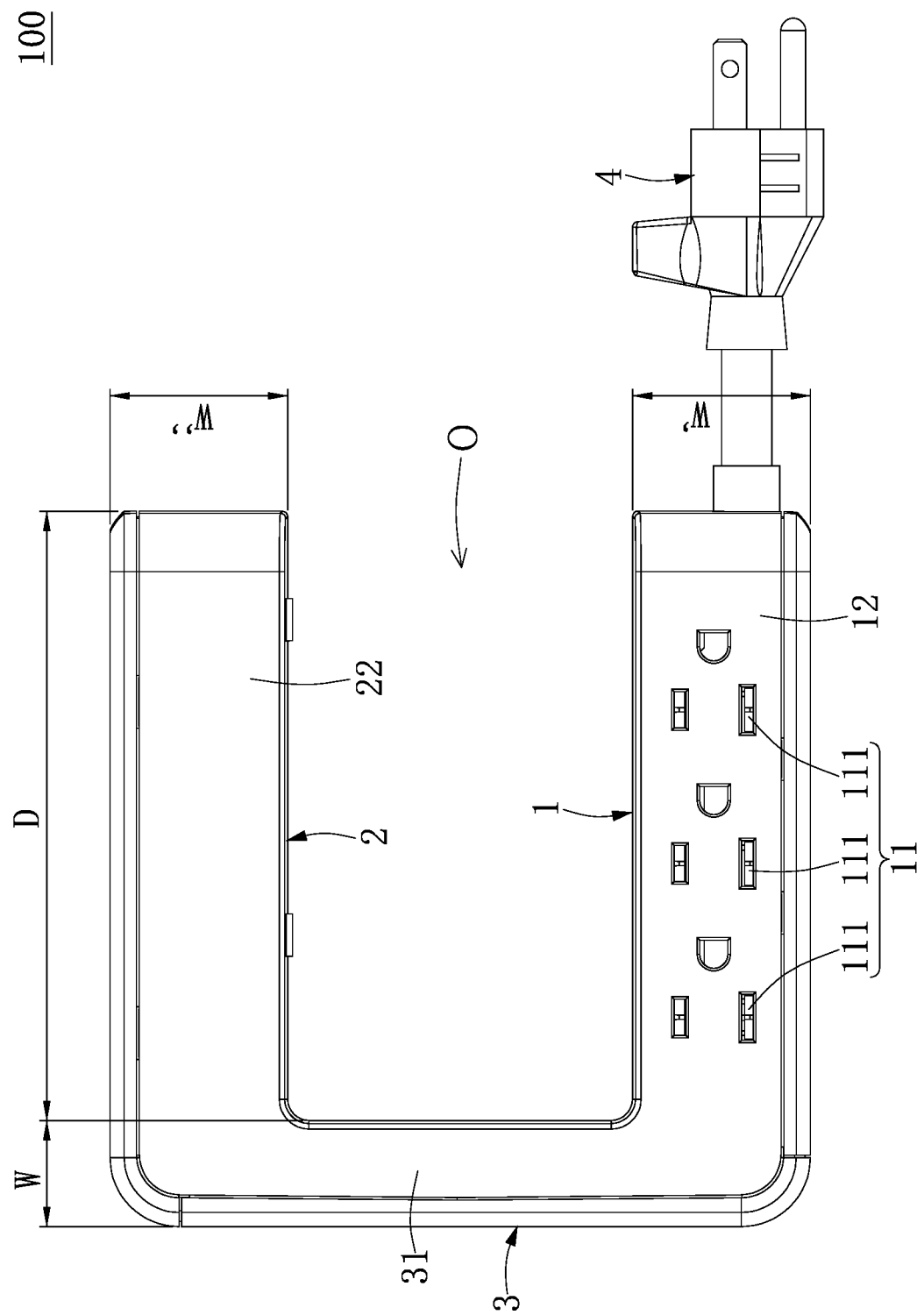
FIG. 3 is a planar view of FIG. 2.

Reference is made to FIGS. 2 to 4, which illustrate a first embodiment of the present disclosure. The difference between the first embodiment and the above common features is disclosed as follows.

The counterweight portion 1 includes a first case 12, and the first outlet unit 11 is disposed in the first case 12. In other words, the first case 12 and the components arranged in the first case 12 in the present embodiment are co-defined as the counterweight portion 1. The first outlet unit 11 includes at least one alternating current (AC) power outlet 111, and an opening of the at least one AC power outlet 111 is arranged on a surface of the counterweight portion 1 (i.e., a side surface of the first case 12 as shown in FIG. 2) which does not face the hanging portion 2, but the present disclosure is not limited thereto.

The hanging portion 2 includes a second case 22, and the second outlet unit 21 is disposed in the second case 22. In other words, the second case 22 and the components arranged in the second case 22 in the present embodiment are co-defined as the hanging portion 2. The second outlet unit 21 includes at least one direct current (DC) power outlet 211 (i.e., a USB outlet), and an opening of the at least one DC power outlet 211 is formed on a surface of the hanging portion 2 (i.e., a top surface of the second case 22 as shown in FIG. 2) which is arranged distant from the counterweight portion 1, but the present disclosure is not limited thereto.

Moreover, the hanging portion 2 in the present embodiment further includes a switch unit 23 for controlling the second outlet unit 21 and/or the first outlet unit 11 to supply electricity. The switch unit 23 is disposed on the surface of the hanging portion 2 (i.e., the top surface of the second case 22 as shown in FIG. 2) which is arranged distant from the counterweight portion 1, so that a user can conveniently operate the switch unit 23.

The extending portion 3 includes a third case 31. The third case 31 and the components arranged in the third case 31 in the present embodiment are co-defined as the extending portion 3, and the extending portion 3 in the present embodiment is preferably provided without any outlet unit. The third case 31 has a first end and an opposite second end, and the first end and the second end are respectively and perpendicularly connected to the first case 12 and the second case 22. Specifically, the first end of the third case 31 (i.e., the bottom end of the third case 31 as shown in FIG. 3) is integrally connected to the first case 12, and the second end of the third case 31 (i.e., the top end of the third case 31 as shown in FIG. 3) is integrally connected to the second case 22.

The length of the first case 12 in the present embodiment is substantially equal to that of the second case 22. The first case 12, the second case 22, and the third case 31 are formed as a U-shaped structure so as to form a U-shaped hanging slot O on an inner side of the U-shaped structure for being hung on the periphery portion of the plate 200. The first case 11 is parallel to the second case 12, the first case 12 and the second case 22 have a predetermined distance there-between for allowing the U-shaped structure to be hung on the periphery portion of the plate 200, and the predetermined distance in the present embodiment is fixed. Moreover, the width W' of the first case 12 is substantially equal to the width W" of the second case 22, and the width W of the third case 31 is smaller than the width W' of the first case 12.

In other words, when in use, the periphery portion of the plate 200 is inserted into the U-shaped hanging slot O defined by the first case 12, the second case 22, and the third case 31, the counterweight portion 1 is arranged under the plate 200 and the hanging portion 2 is arranged above the plate 200, the outlet device 100 remains hung on the periphery portion of the plate 200 due to a self weight of the outlet device 100, thereby maintaining the outlet device 100 in a static balance state. Moreover, when the U-shaped hanging slot O of the outlet device 100 is hung on the periphery portion of the plate 200, the outlet device 100 does not contact a bottom surface of the plate 200. That is to say, when in use, the periphery portion of the plate 200 is inserted into the U-shaped hanging slot O, and the outlet device 100 does not contact the bottom surface of the plate (e.g., a top of a table). In other words, when the U-shaped hanging slot O of the outlet device 100 is hung on the periphery portion of the plate 200, the second case 22 is apart from the bottom surface of the plate 200.

In addition, a corner of the first case 12 (i.e., the right-lower corner of the first case 12 as shown in FIG. 2) arranged distant from the third case 31 has a notch 121, and the power cord 4 is rotatable to be arranged in the notch 121 of the first case 12, so that a user can conveniently adjust the position of the power cord 4.

In addition, the outlet device 100 for being hung on the periphery portion of a top (i.e., the plate 200) of a table can be also described as follows. The outlet device 100 includes a U-shaped structure, a first outlet 11, and a second outlet 12. The U-shaped structure includes a first case 12, a second case 22, and a third case 31 that is connected to the first case 12 and the second case 22. Moreover, the first case 12, the second case 22, and the third case 31 jointly define a U-shaped hanging slot O on an inner side thereof, and a distance between the first case 12 and the second case 22 is fixed. The first outlet 11 and the second outlet 12 are respectively arranged in the first case 12 and the second case 22. When in use, the periphery portion of the top of the table is inserted into the U-shaped hanging slot O, the first case 12 and the first outlet 11 are arranged under the top of the table and the second case 22 is arranged onto the top of the table, the outlet device 100 remains hung on the periphery portion of the top of the table due to a self weight of the outlet device 100, thereby maintaining the outlet device 100 in a static balance state.

Specifically, when in use, the periphery portion of the top of the table is inserted into the U-shaped hanging slot O, and a lateral edge of the periphery portion of the top (i.e., the plate 200) arranged under the second case 22 faces the third case 31. In other embodiments of the present disclosure, the outlet device 100 of the present embodiment can be hung on an upper side of an office partition (or a counter partition).

Second Embodiment

Figure 5:
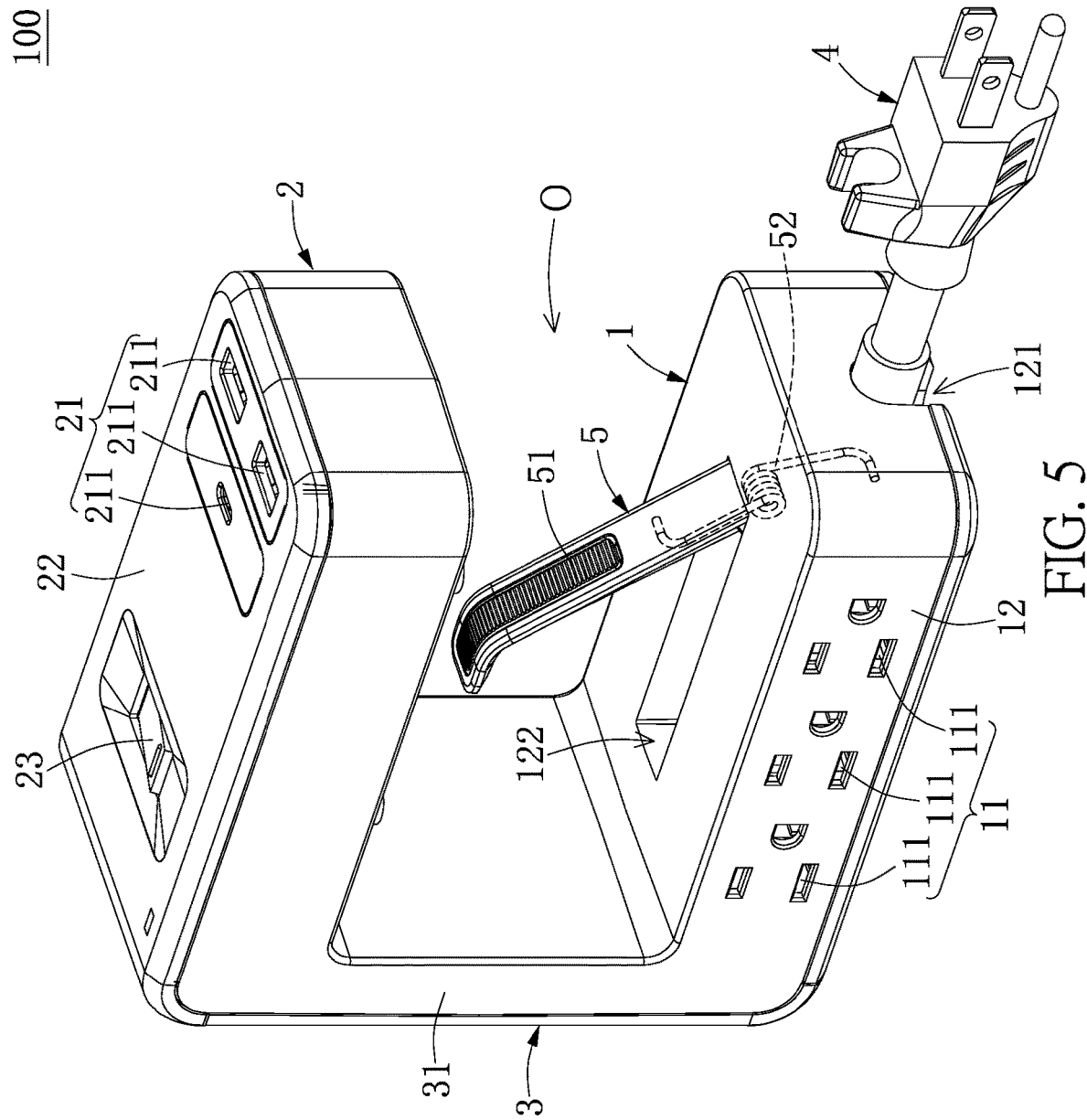
FIG. 5 is a perspective view showing the outlet device according to a second embodiment of the present disclosure.
Figure 6:
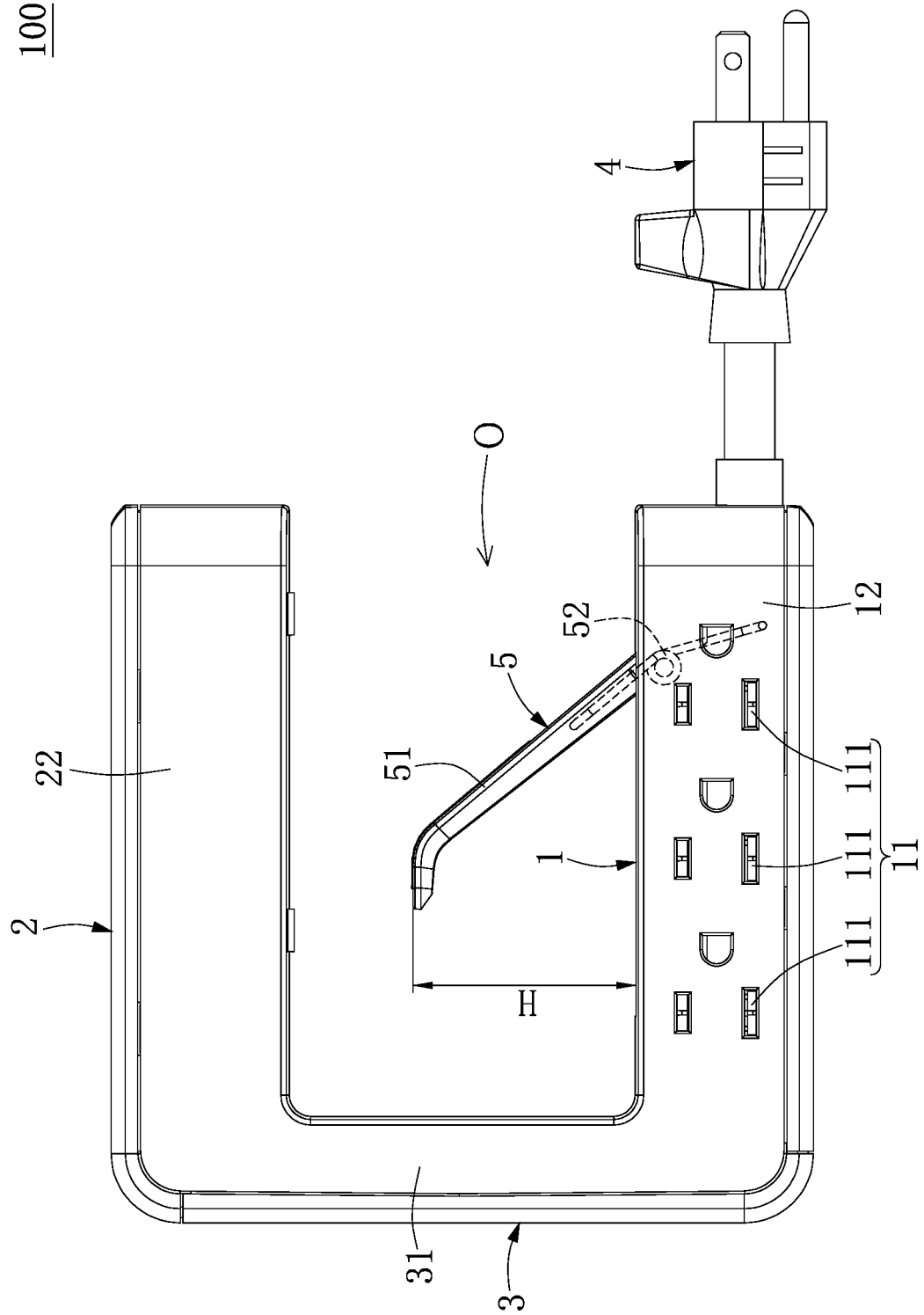
FIG. 6 is a planar view of FIG. 5.
Figure 7:
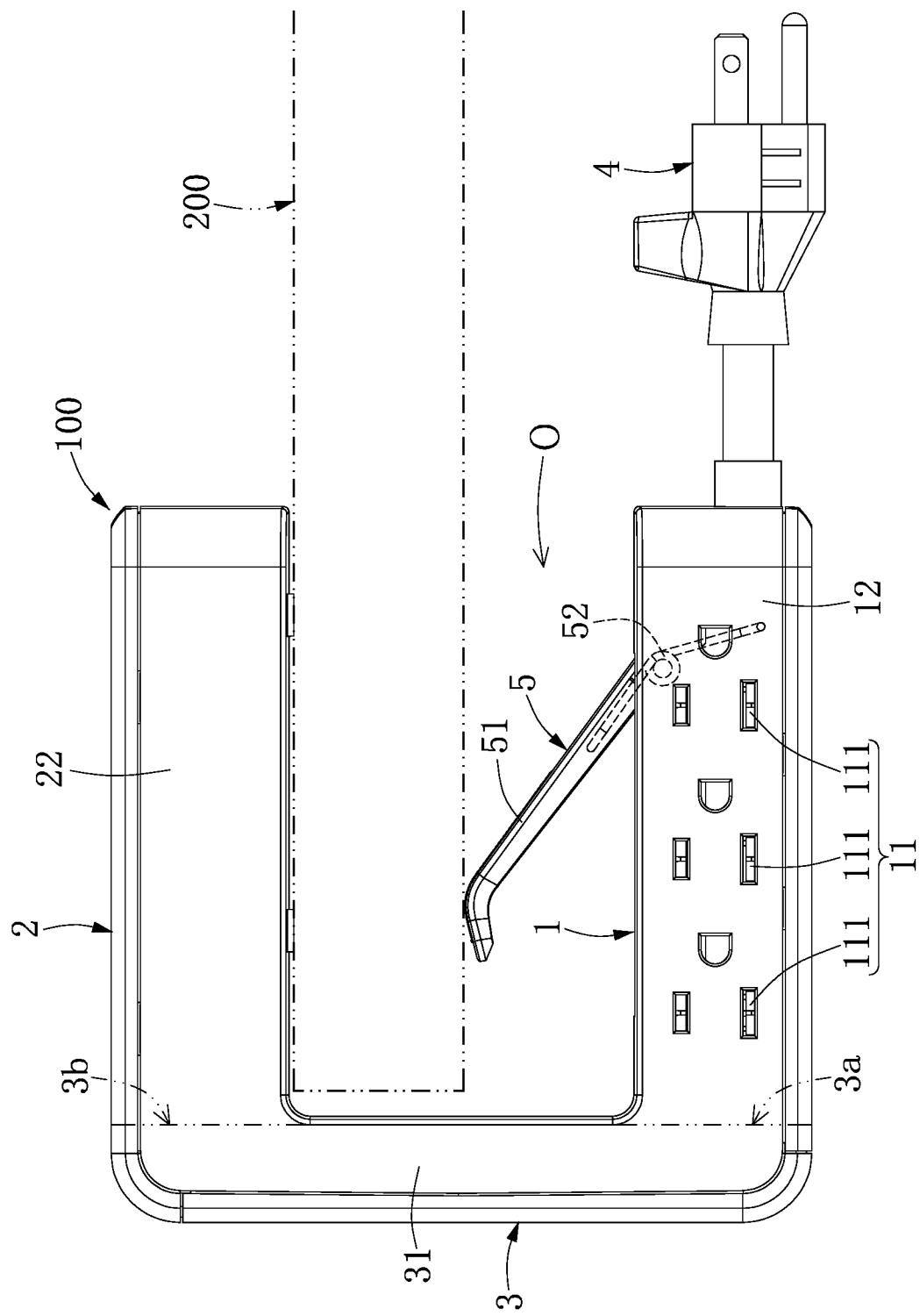
FIG. 7 is a planar view showing the outlet device of FIG. 5 hanging on a periphery portion of a plate.

Reference is made to FIGS. 5 to 7, which illustrate a second embodiment of the present disclosure. The difference between the second embodiment and the first embodiment is disclosed as follows.

The outlet device 100 of the present embodiment further includes a limiting structure 5 movably disposed on the first case 12. The limiting structure 5 is arranged in the U-shaped hanging slot O for abutting against the plate 200. The following description discloses the features of the limiting structure 5, but the present disclosure is not limited thereto.

The limiting structure 5 includes an abutting member 51 and an elastic member 52 (i.e., a torsion spring). An end of the abutting member 51 (i.e., the bottom end of the abutting member 51 as shown in FIG. 6) is disposed on (i.e., pivotally connected to) the first case 12 by cooperating with the elastic member 52, and an opposite end of the abutting member 51 (i.e., the top end of the abutting member 51 as shown in FIG. 6) is arranged apart from the first case 12 by a vertical distance H. Specifically, a distance between the abutting member 51 and the first case 12 is gradually increased in a direction from bottom to top (i.e., a direction from right side to left side as shown in FIG. 6), and the vertical distance H is the maximum distance between the abutting member 51 and the first case 12.

Moreover, an accommodating slot 122 is recessed in an inner surface of the first case 12 (i.e., a surface of the first case 12 faces the second case 22) and is in air communication with the U-shaped hanging slot O. The accommodating slot 122 is configured to receive the limiting structure 5, and the abutting member 51 of the limiting structure 5 is movable toward (or movable into) the accommodating slot 122 when being pressed.

In more detail, when the abutting member 51 is pressed to cause reduction of the vertical distance H, that is to say, the top end of the abutting member 51 as shown in FIG. 7 movers toward the accommodating slot 122, the elastic member 52 stores an elastic force tending to recover the vertical distance H, so that the abutting member 51 can abut against the plate 200 by the elastic force generated from the elastic member 52.

Third Embodiment

Reference is made to FIGS. 8 to 12, which illustrate a third embodiment of the present disclosure. The difference between the third embodiment and the first embodiment is disclosed as follows.

Figure 8:
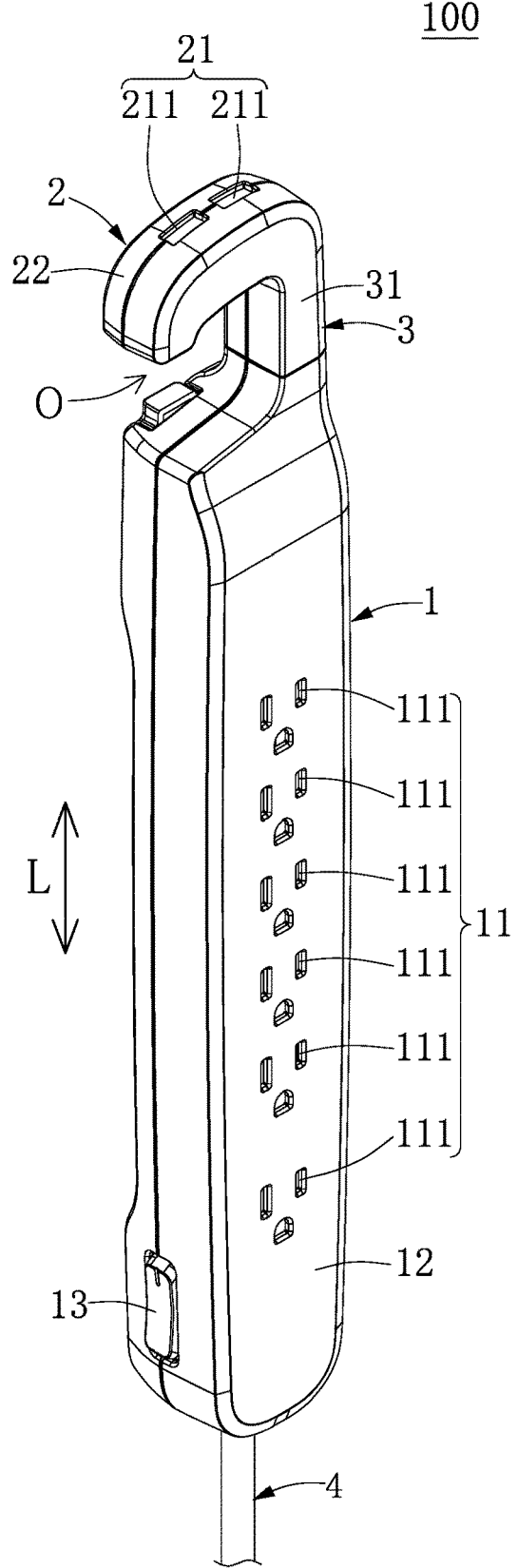
FIG. 8 is a perspective view showing the outlet device according to a third embodiment of the present disclosure.
Figure 9:
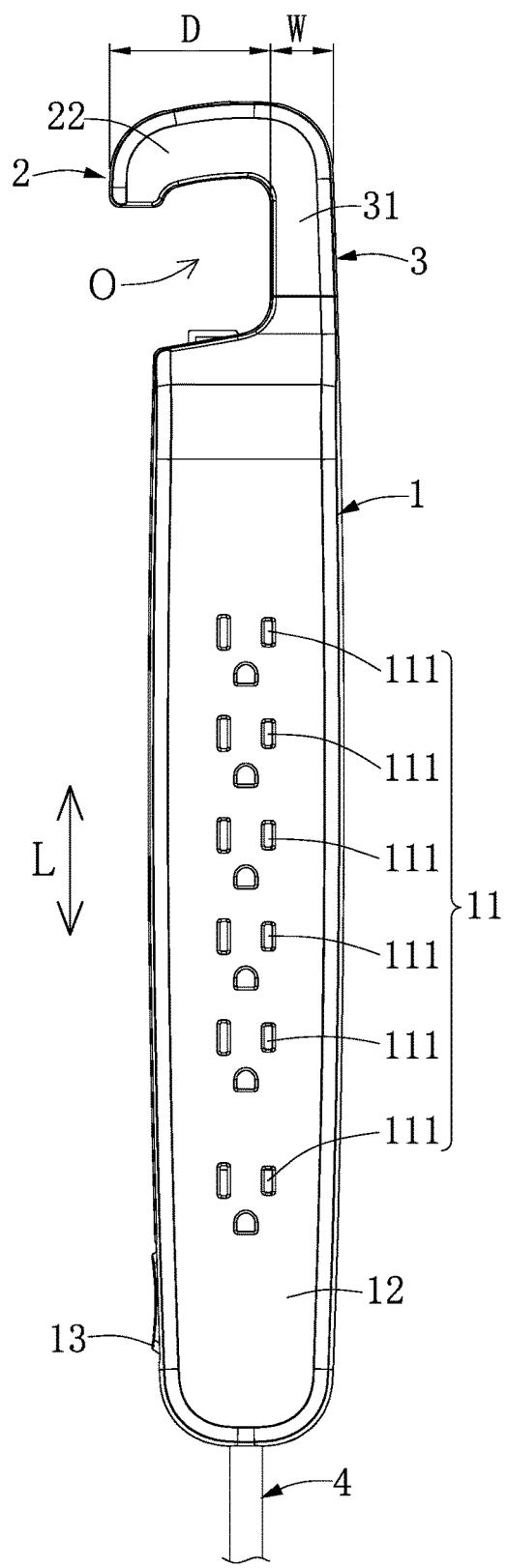
FIG. 9 is a planar view of FIG. 8.
Figure 10:
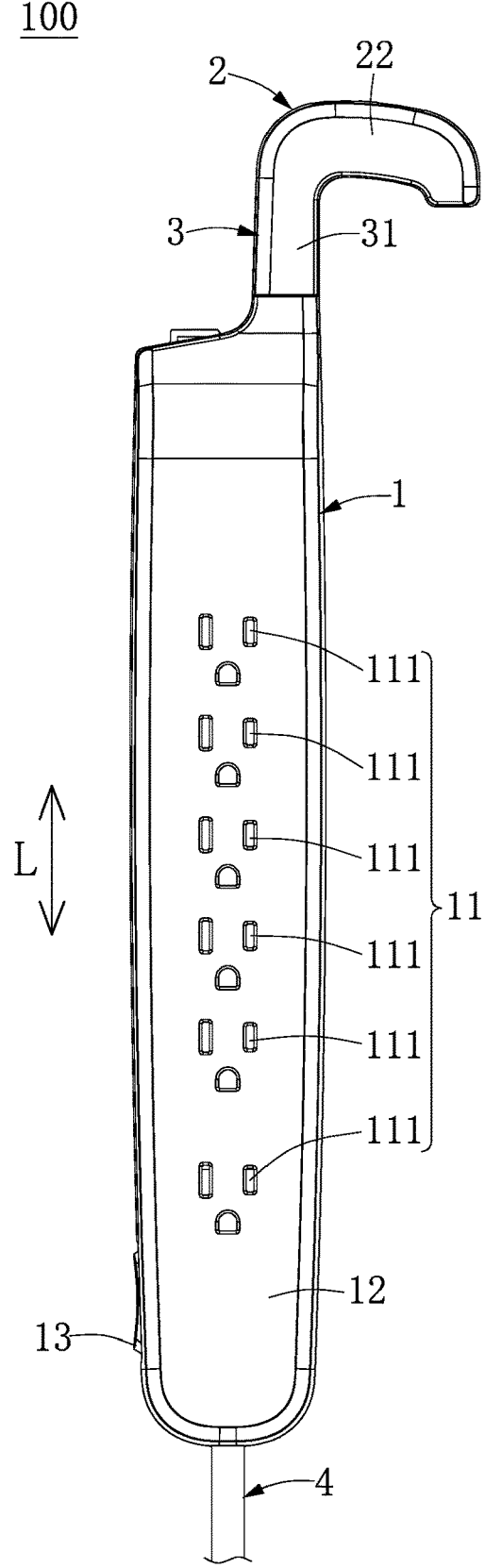
FIG. 10 is a planar view showing that the counterweight portion and the extending portion of FIG. 8 are rotatable relative to each other.
Figure 11:
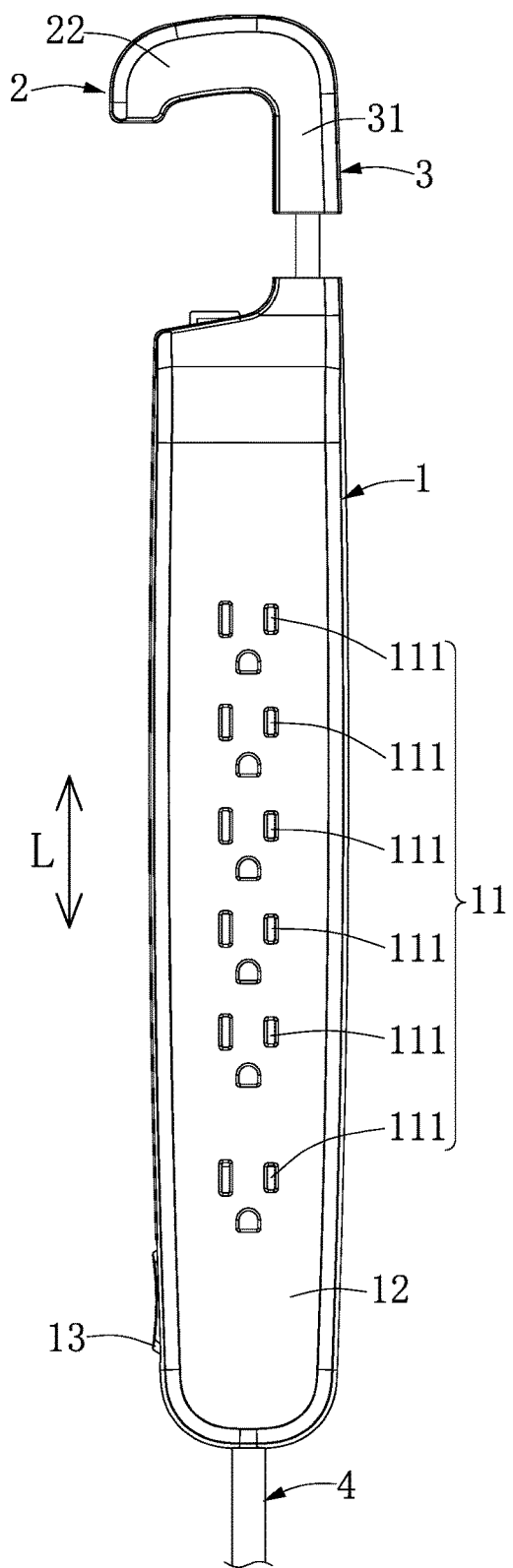
FIG. 11 is a planar view showing that the counterweight portion and the extending portion of FIG. 8 are retractable relative to each other.
Figure 12:
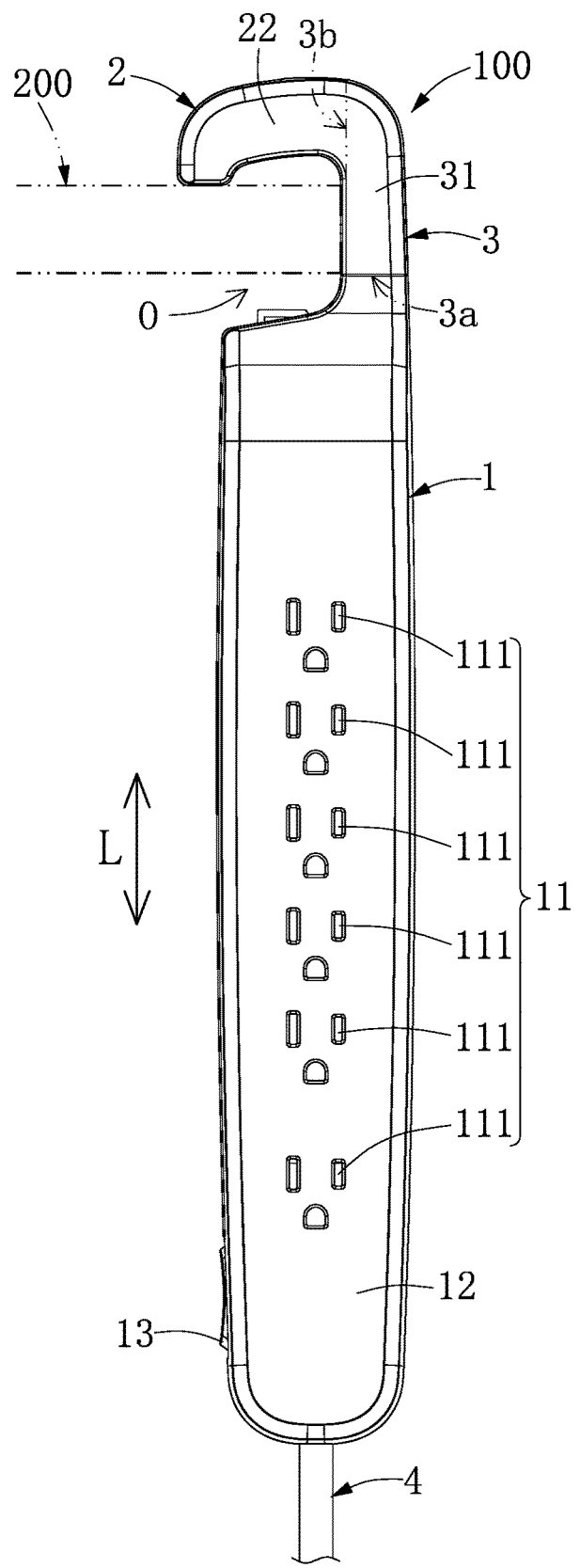
FIG. 12 is a planar view showing the outlet device of FIG. 8 hanging on a periphery portion of a plate.

The first case 12 in the present embodiment having an elongated shape defines a longitudinal direction L, which is perpendicular to the lateral direction D and the width W. The first end of the third case 31 (i.e., the bottom end of the third case 31 as shown in FIGS. 8 and 9) is movably connected to the first case 12, and the second end of the third case 31 (i.e., the top end of the third case 31 as shown in FIGS. 8 and 9) is integrally connected to the second case 22. Moreover, the connection of the first end of the third case 31 and the first case 12 in the present embodiment can be, but is not limited to, a rotatable connection as shown in FIG. 10 or a retractable connection as shown in FIG. 11.

Specifically, the first outlet unit 11 includes a plurality of AC power outlets 111 arranged in one row parallel to the longitudinal direction L. The counterweight portion 1 has a switch unit 13 disposed on a bottom of the first case 12 for controlling the first outlet unit 11 and/or the second outlet unit 21 to supply electricity. The hanging portion 2 in the present embodiment is provided without any switch unit. Moreover, the power cord 4 is connected to an end of the counterweight portion 1 (i.e., the bottom end of the first case 12) arranged distant from the hanging portion 2.

In conclusion, the outlet device of the present disclosure can satisfy a condition where an outlet is needed both over and under a plate (or a top) of a table at the same time by disposing the hanging portion on the periphery portion of the plate to provide the first outlet unit under the plate and the second outlet unit above the plate.

Moreover, the outlet device of the present disclosure can be firmly hung on the periphery portion of the plate, which may have different thickness, by forming the limiting structure in the U-shaped hanging slot and using the limiting structure to abut against the plate.

In addition, the connection of the extending portion and the counterweight portion can be a movable connection, so that the outlet device of the present disclosure can be applied to different environments and can satisfy a user's different needs.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An outlet device for being hung on a periphery portion of a plate of a furniture, comprising:
   a counterweight portion including a first case and a first outlet unit arranged in the first case;
   a hanging portion including a second case and a second outlet unit arranged in the second case;
   an extending portion including a third case having two opposite ends respectively connected to the first case of the counterweight portion and the second case of the hanging portion; and
   a power cord electrically connected to at least one of the first outlet unit and the second outlet unit through a front side of the first case that is different from a lateral side of the first case corresponding in position to the first outlet unit,
   wherein the first case, the second case, and the third case are formed with a U-shaped hanging slot on an inner side thereof for being hung on the periphery portion of the plate; when the U-shaped hanging slot of the outlet device is hung on the periphery portion of the plate by adapting the counterweight portion to be arranged under the plate and the hanging portion to be arranged on the plate, the hanging portion remains hung on the plate by using a weight distribution of the outlet device, thereby maintaining the outlet device in a static balance state,
   wherein each of a free end of the hanging portion and the front side of the first case is arranged distant from the extending portion by a lateral distance along a lateral direction, and a width of the third case along the lateral direction is less than the lateral distance, and wherein a width of the first case along a direction perpendicular to the lateral direction is equal to a width of the second case along the direction, and the width of the third case is less than the width of the first case.

2. The outlet device as claimed in claim 1, wherein the third case has a first end and an opposite second end, the first end and the second end are respectively defined as the two opposite ends of the extending portion, and the first end and the second end are respectively and perpendicularly connected to the first case and the second case.

3. The outlet device as claimed in claim 2, wherein the first end and the second end of the third case are integrally connected to the first case and the second case.

4. The outlet device as claimed in claim 3, wherein a corner of the first case arranged distant from the third case has a notch, and the power cord is rotatable to be arranged in the notch of the first case.

5. The outlet device as claimed in claim 1, further comprising a limiting structure movably disposed on the first case, wherein the limiting structure is arranged in the U-shaped hanging slot for abutting against the plate.

6. The outlet device as claimed in claim 5, wherein the limiting structure includes an abutting member and an elastic member, an end of the abutting member is disposed on the first case by cooperating with the elastic member, and an opposite end of the abutting member is arranged apart from the first case by a vertical distance, and wherein when the abutting member is pressed to cause reduction of the vertical distance, the elastic member stores an elastic force tending to recover the vertical distance.

7. The outlet device as claimed in claim 5, wherein an accommodating slot is recessed in an inner surface of the first case and is in air communication with the U-shaped hanging slot, and the limiting structure is movable toward the accommodating slot when being pressed.

8. The outlet device as claimed in claim 1, wherein the first case, the second case, and the third case are formed as a U-shaped structure, and the first case and the second case have a predetermined distance there-between for allowing the U-shaped structure to be hung on the periphery portion of the plate.

9. The outlet device as claimed in claim 8, wherein when the U-shaped hanging slot of the outlet device is hung on the periphery portion of the plate, the outlet device does not contact a bottom surface of the plate.

10. The outlet device as claimed in claim 1, wherein the first case is parallel to the second case, and when the U-shaped hanging slot of the outlet device is hung on the periphery portion of the plate, the second case is apart from a bottom surface of the plate.

11. An outlet device for being hung on a periphery portion of a plate of a furniture, comprising:
   a counterweight portion including a first case and a first outlet unit arranged in the first case;
   a hanging portion including a second case and a second outlet unit arranged in the second case;
   an extending portion including a third case having two opposite ends respectively connected to the first case of the counterweight portion and the second case of the hanging portion, the first case, the second case, and the third case defining a U-shaped hanging slot for receiving the periphery portion of the plate, wherein a free end of the second case is arranged distant from the third case of the extending portion by a lateral distance, wherein the lateral distance is defined as a distance between the free end of the second case and the third case along a lateral direction which is a direction perpendicular to the third case, the third case has a width along the lateral direction, the width of the third case is less than the lateral distance between the free end of the second case and the third case, and wherein a width of the first case along a direction perpendicular to the lateral direction is equal to a width of the second case along a direction perpendicular to the lateral direction, and the width of the third case is less than the width of the first case; and
   a power cord electrically connected to the first outlet unit and the second outlet unit through a front side of the first case that is different from a lateral side of the first case corresponding in position to the first outlet unit,
   wherein when in use, the periphery portion of the plate is inserted into the U-shaped hanging slot defined by the first case, the second case, and the third case, the counterweight portion is arranged under the plate and the hanging portion is arranged onto the plate, the outlet device remains hung on the periphery portion of the plate due to a self weight of the outlet device, thereby maintaining the outlet device in a static balance state.

12. The outlet device as claimed in claim 11, wherein the first case, the second case, and the third case are formed as a U-shaped structure, and a distance between the first case and the second case is fixed.

13. The outlet device as claimed in claim 12, wherein when in use, the periphery portion of the plate is inserted into the U-shaped hanging slot, and the outlet device does not contact a bottom surface of the plate.

14. An outlet device for being hung on a periphery portion of a top of a table, comprising:
   a U-shaped structure including a first case, a second case, and a third case that is connected to the first case and the second case, wherein the first case, the second case, and the third case jointly define a U-shaped hanging slot on an inner side thereof, and a distance between the first case and the second case is fixed; and
   a first outlet and a second outlet respectively arranged in the first case and the second case;
   wherein when in use, the periphery portion of the top of the table is inserted into the U-shaped hanging slot, the first case and the first outlet are arranged under the top of the table and the second case is arranged onto the top of the table, the outlet device remains hung on the periphery portion of the top of the table due to a self weight of the outlet device, thereby maintaining the outlet device in a static balance state,
   wherein each of a free end of the second case and a free end of the first case is arranged distant from the extending portion by a lateral distance along a lateral direction, and a width of the third case along the lateral direction is less than the lateral distance, and wherein a width of the first case along a direction perpendicular to the lateral direction is equal to a width of the second case along the direction, and the width of the third case is less than the width of the first case.

15. The outlet device as claimed in claim 14, wherein the third case is integrally connected to the first case and the second case.

16. The outlet device as claimed in claim 14, wherein when in use, the outlet device does not contact a bottom surface of the top of the table.

* * * * *